US011857496B2

(12) United States Patent
Blezard et al.

(10) Patent No.: US 11,857,496 B2
(45) Date of Patent: Jan. 2, 2024

(54) TEMPERATURE CONTROLLED PRODUCT SHIPPER WITH A DUAL PHASE CHANGE MATERIAL LIQUID SUSPENSION

(71) Applicant: Packaging Technology Group, LLC, Fall River, MA (US)

(72) Inventors: William C. Blezard, Mattapoisett, MA (US); Muhammad Kashif Azeem, Waltham, MA (US)

(73) Assignee: Packaging Technology Group, LLC, Fall River, MA (US)

(*) Notice: Subject to any disclaimer, the term of this patent is extended or adjusted under 35 U.S.C. 154(b) by 34 days.

(21) Appl. No.: 17/180,771

(22) Filed: Feb. 20, 2021

(65) Prior Publication Data

US 2022/0265514 A1 Aug. 25, 2022

(51) Int. Cl.

| | |
|---|---|
| ***A61J 1/16*** | (2023.01) |
| ***B65D 81/38*** | (2006.01) |
| ***B65D 81/18*** | (2006.01) |
| ***F25D 3/06*** | (2006.01) |

(52) U.S. Cl.

CPC ................. *A61J 1/165* (2013.01); *A61J 1/16* (2013.01); *B65D 81/18* (2013.01); *B65D 81/3813* (2013.01); *F25D 3/06* (2013.01); *F25D 2201/12* (2013.01); *F25D 2303/08222* (2013.01)

(58) Field of Classification Search

CPC ............. F25D 2303/08222; F25D 3/08; F25D 11/003; F25D 11/006; F25D 2331/8014; F25D 2303/085; F25D 3/06; F25D 2201/12; A61J 1/165; A61J 1/16; B65D 81/3827; B65D 81/3813; B65D 81/18

See application file for complete search history.

(56) References Cited

U.S. PATENT DOCUMENTS 3,712,875 A 1/1973 Tijunelis
5,390,791 A * 2/1995 Yeager ................. A61B 50/312 206/828
9,181,465 B2 11/2015 Seidling et al.

(Continued)

FOREIGN PATENT DOCUMENTS

WO WO-2020084543 A1 4/2020

OTHER PUBLICATIONS

"4.11 Suspensions and Colloids" LibreTexts, last updated Oct. 2019, retrieved from internet <https://chem.libretexts.org/Courses/Grand_Rapids_Community_College/CHM_120 _-_ Survey_of_General_Chemistry/4%3A_Intermolecular_Forces_Phases_and_Solutions/4.11_Solutions_Part_1> on Feb. 1, 2023. (Year: 2019).*

(Continued)

*Primary Examiner* — Cassey D Bauer
(74) *Attorney, Agent, or Firm* — Goodwin Procter LLP

(57) ABSTRACT

A temperature-controlled shipper for shipping diagnostic blood samples is disclosed. The shipper must remain at a temperature between 6° C. and 37° C. for up to 24 hours while in transit. The shipper includes identical mating PCM blow-molded bottles which enclose and protect diagnostic blood sample vials. Identical mating clamshell insulating containers further enclose and protect the PCM bottles. Both the bottles and clamshell containers can be re-used. A dual PCM liquid suspension is utilized in the PCM bottles and is preconditioned and stored at a single temperature.

17 Claims, 5 Drawing Sheets

(56) References Cited

U.S. PATENT DOCUMENTS

| | | | |
|---|---|---|---|
| 9,279,075 B2 | 3/2016 | Parker et al. | |
| 9,371,169 B1 | 6/2016 | Petrucci et al. | |
| 9,556,373 B2 | 1/2017 | Formato et al. | |
| 9,598,622 B2 | 3/2017 | Formato et al. | |
| 10,077,389 B2 | 9/2018 | Formato et al. | |
| 11,103,421 B1 * | 8/2021 | Madigan | B65D 25/10 |
| 2007/0148447 A1 | 6/2007 | Amundson et al. | |
| 2013/0302392 A1 | 11/2013 | Mistry et al. | |
| 2015/0018480 A1 | 1/2015 | Hartmann | |
| 2015/0239640 A1 | 8/2015 | Smith et al. | |
| 2017/0204313 A1 | 7/2017 | Karunakaran et al. | |
| 2018/0037788 A1 | 2/2018 | Sawafta et al. | |
| 2019/0085226 A1 | 3/2019 | Formato et al. | |
| 2019/0127620 A1 | 5/2019 | Wei et al. | |
| 2019/0282989 A1 | 9/2019 | Feng et al. | |
| 2020/0354536 A1 | 11/2020 | Peterson et al. | |
| 2020/0383320 A1 | 12/2020 | Silvestre Duarte et al. | |
| 2021/0396446 A1 * | 12/2021 | Nagar | A01N 1/0263 |

OTHER PUBLICATIONS

"7.6 Colloids and Suspensions" Libretexts, last updated Aug. 2020, retrieved from internet <https://chem.libretexts.org/Courses/University_of_Kentucky/UK%3A_CHE_103_-_Chemistry_for_Allied_Health_(Soult)/Chapters/Chapter_7%3A_Solids_Liquids_and_Gases/7.6%3A_Colloids_and_Suspensions> on Feb. 1, 2023. (Year: 2019).*

Written Opinion and International Search Report for International Patent Application No. PCT/US2022/014827, dated Jun. 13, 2022 (14 pages).

Written Opinion and International Search Report for International Patent Application No. PCT/US2022/014824, dated Apr. 6, 2022 (16 pages).

Huang et al., "Thermal Properties and Applications of Microencapsulated PCM for Thermal Energy Storage: a Review," Applied Thermal Engineering 147:841-855 (2019).

U.S. Appl. No. 17/180,774, filed Feb. 20, 2021, William C. Blezard.

* cited by examiner

TEMPERATURE CONTROLLED PRODUCT SHIPPER WITH A DUAL PHASE CHANGE MATERIAL LIQUID SUSPENSION

BACKGROUND OF THE DISCLOSURE

Field of the Invention

The present disclosure relates to the shipping of temperature sensitive products, temperature-controlled product shippers, and phase change materials (PCMs). More specifically, the disclosure relates to a temperature-controlled shipper for shipping diagnostic blood sample vials which must remain at a temperature between 6° C. and 37° C. for up to 24 hours while in transit and a dual phase change material liquid suspension for use therein.

Background

Generally, in the prior art, phase change materials (PCM's) in the form of packs or bricks are used to heat or cool the interior of temperature-controlled product shippers. The heating or cooling profile of a product shipper is calculated based on the shape, volume and weight of the product being shipped, a desired target temperature and a duration of temperature maintenance. A combination of different "frozen" or "heated" packs or bricks may then be strategically utilized to maintain the product at the target temperature. Before use, the individual packs are preconditioned to a specific temperature. For example, in some cold chain applications, there may be two temperatures required to maintain a product at the desired temperature: i.e. −20° C. and +5° C. These two temperature profiles are provided by separate PCM materials in different pack or bricks. The packs are preconditioned separately at their profile temperature, and are stored separately, and there is therefore a significant amount of energy consumed in preconditioning the PCM materials at different temperatures. There is also a significant amount of waste generated in disposing of the conventional PCM packs bricks which are often discarded at the point of receipt.

Due to increasing demands from environmentally conscious customers and the public, there is a growing need to reduce energy consumed during preconditioning of the PCM materials and to recycle or reuse packaging materials in the logistics chain.

SUMMARY OF THE DISCLOSURE

The present invention provides a unique temperature-controlled shipper which is specifically designed for shipping diagnostic blood sample vials which must remain at a temperature between 6° C. and 37° C. for up to 24 hours while in transit.

An exemplary temperature-controlled shipper includes identical mating PCM blow-molded containers or bottles which enclose and protect diagnostic blood sample vials. Identical mating clamshell insulating portions further enclose and protect the PCM bottles which in turn protect and hold the blood sample vials. Both the PCM bottles and clamshell insulating portions may be molded from plastic and may be re-used within the end user's shipping and logistics chain.

Further in accordance with the exemplary embodiments, a dual PCM liquid suspension is utilized in the PCM bottles and is preconditioned and stored at a single temperature. An exemplary dual phase change material liquid suspension comprises a first liquid phase change material having a first phase change temperature and a second microencapsulated phase change material having a second phase change temperature. The first and second phase change materials are mixed and combined in a uniform homogenous mixture (liquid suspension) and as noted above, are pre-conditioned at a single temperature.

Accordingly, among the objects of the instant invention are: the provision of a unique PCM shipper including identical mating PCM containers which enclose and protect the diagnostic blood sample vials and which can be re-used; the provision of identical mating clamshell insulating containers which further enclose and protect the PCM containers and which can also be re-used; and a novel dual PCM liquid suspension mixture for use in the PCM containers which can be preconditioned and stored at a single temperature thus reducing energy consumption and storage requirements.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE EXEMPLARY EMBODIMENTS

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

The present invention provides a unique temperature-controlled shipper 10 which is specifically designed for shipping diagnostic 10 ml blood sample vials 12 which must remain at a temperature between 6° C. and 37° C. for up to 24 hours while in transit.

Figure 1:
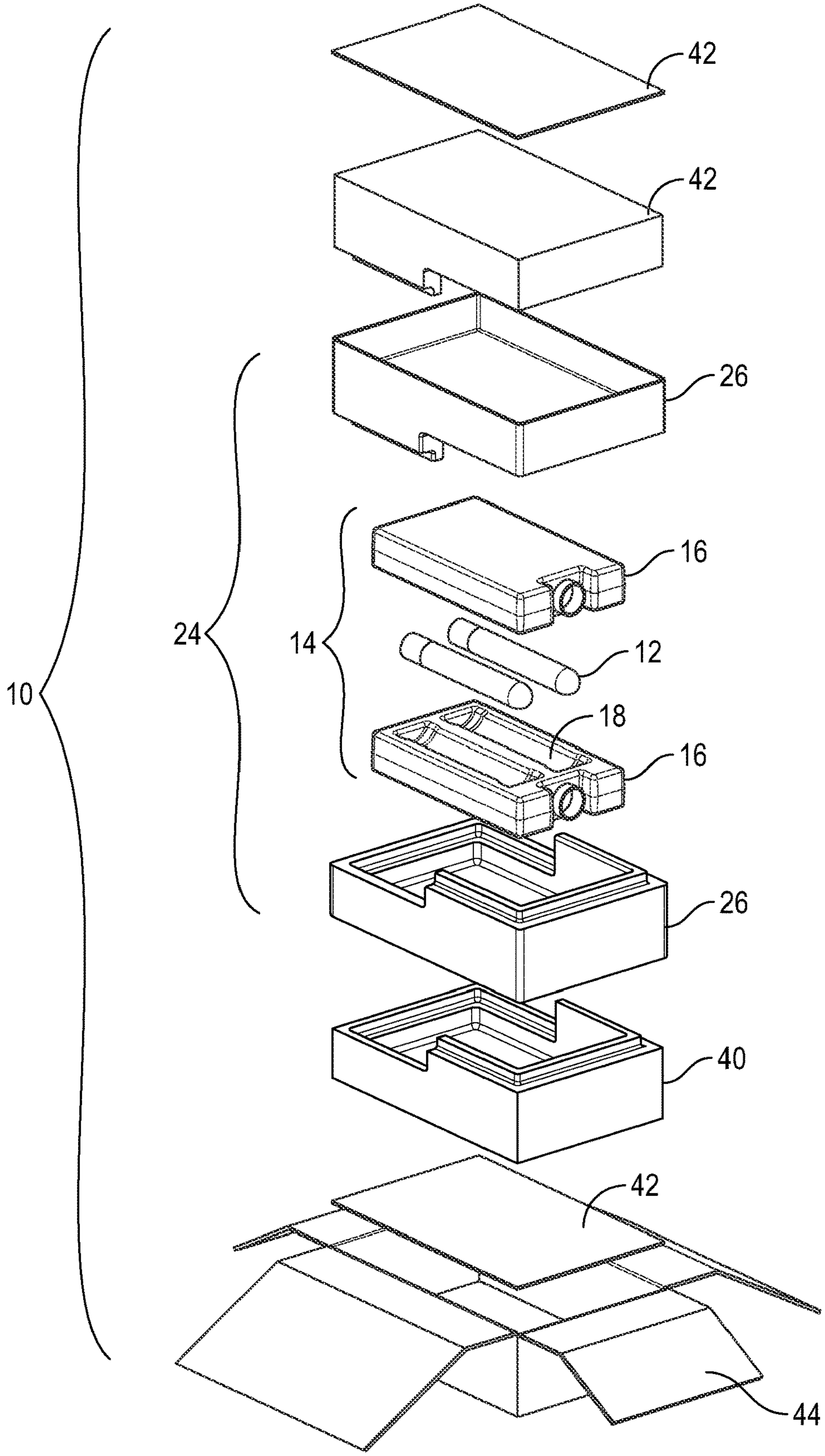
FIG. 1 is an exploded view of an exemplary embodiment of a temperature-controlled shipper constructed in accordance with the teachings of the present invention.
Figure 2:
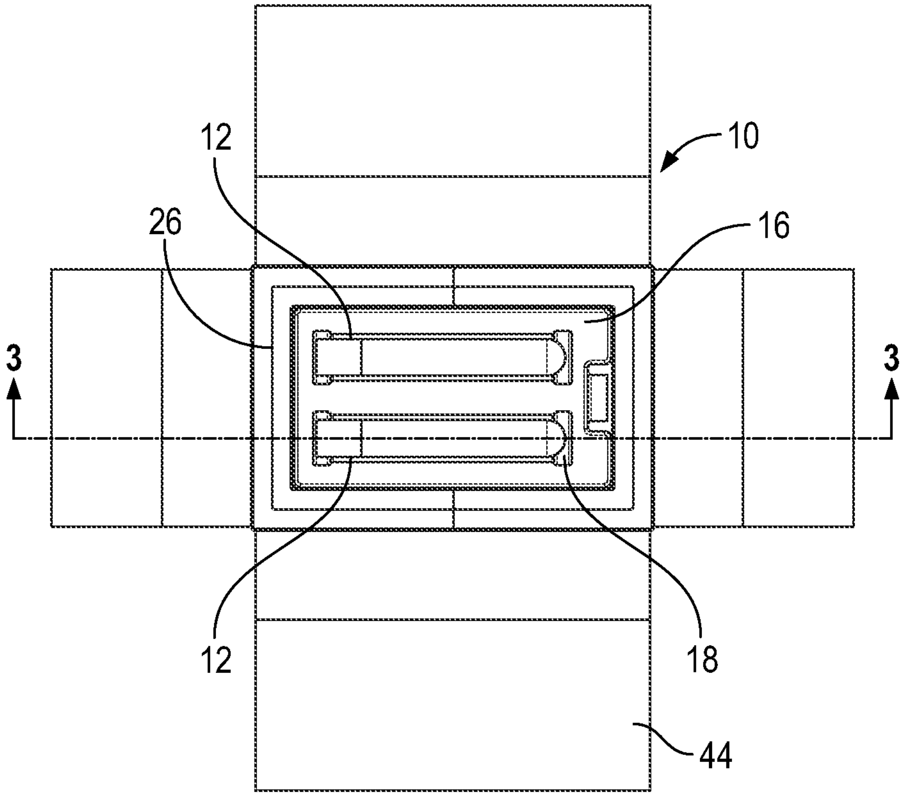
FIG. 2 is a top view of the shipper.
Figure 3:
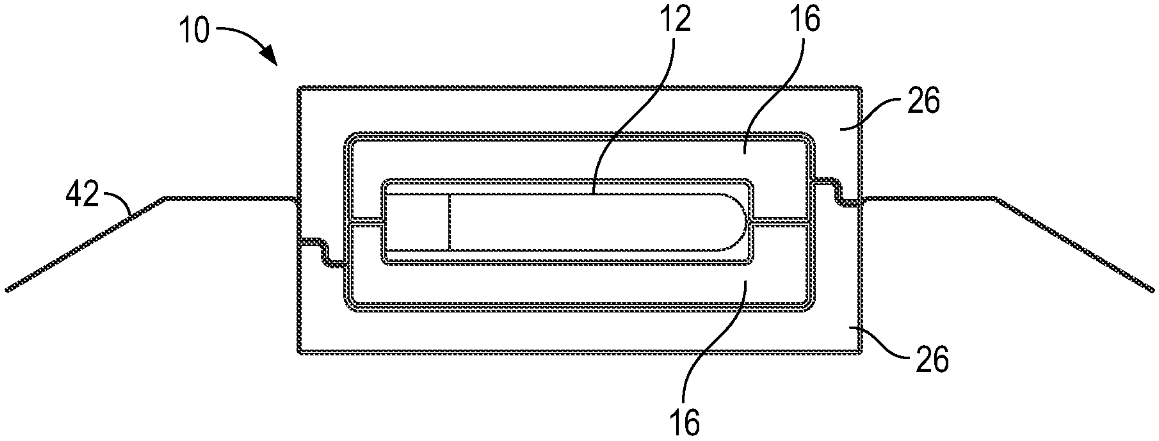
FIG. 3 is a cross-sectional view thereof taken along line 3-3 of FIG. 2.
Figure 4:
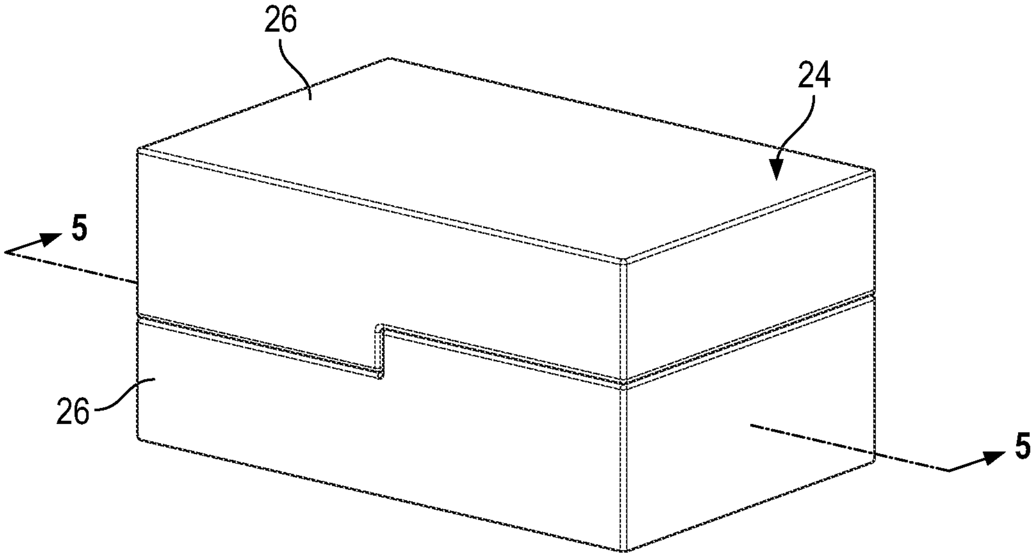
FIG. 4 is a perspective view of the shipper.

Referring now to the drawings, an exemplary embodiment of a temperature-controlled shipper 10 is illustrated in FIGS. 1-3. The shipper 10 includes a product receptacle 14 comprising identical mating PCM blow-molded containers or bottles 16 which enclose and protect one or more diagnostic blood sample vials 12. Briefly referring to FIGS. 4 and 5, the facing surfaces of the exemplary bottles 16 are contoured and shaped with semi-cylindrical cavities 18 to receive elongated cylindrical glass vials 12 for holding blood samples. The exemplary embodiment as illustrated and described should not be considered to limit the scope of potential use of the invention and it should be understood that other shapes and types of product containers could be equally employed. The PCM containers 12 may include a filling port 20 at one end thereof and they are filled, after molding, with a dual phase change material liquid suspension 22 and sealed in a conventional manner. The exemplary PCM bottles 16 are noted herein to be identical which reduces molding costs and simplifies reuse and interchangeability, but different shapes may be used for the top and bottom portions as desired.

Turning back to FIGS. 1-3, an insulating case 24 comprising identical mating insulated clamshell portions 26 further encloses and protect the PCM bottles 16 which in turn protect and hold the blood sample vials 12. Both the PCM bottles 16 and clamshell container portions 26 may be molded from plastic and may be re-used within the user's shipping and logistics chain.

Figure 5:
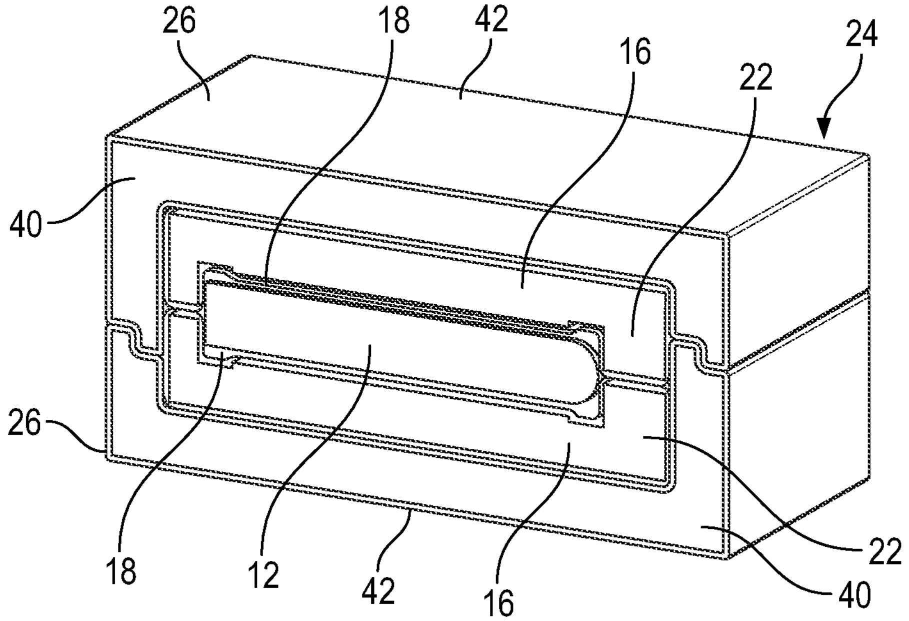
FIG. 5 is a cross-sectional view taken along line 5-5 of FIG. 4.
Figure 6:
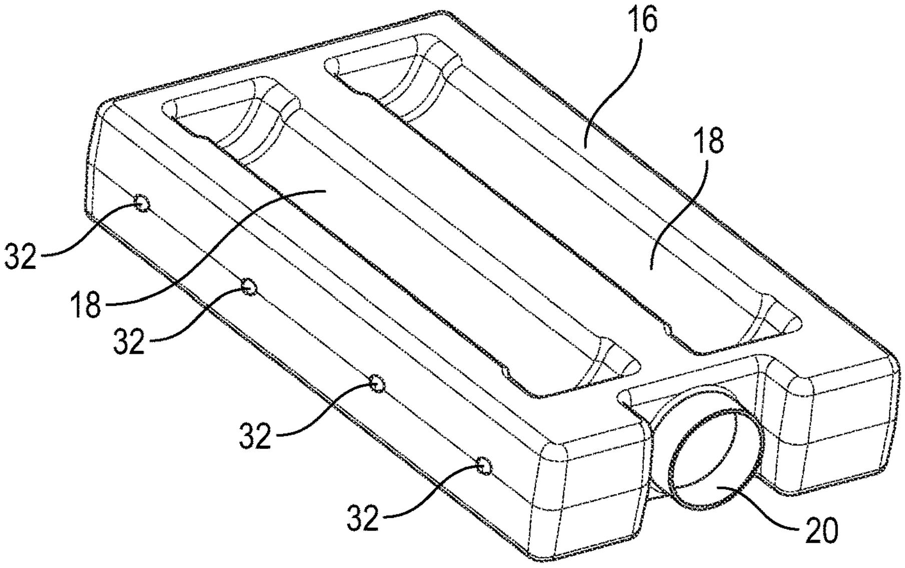
FIG. 6 is a perspective view of the internal phase change material container.
Figure 7:
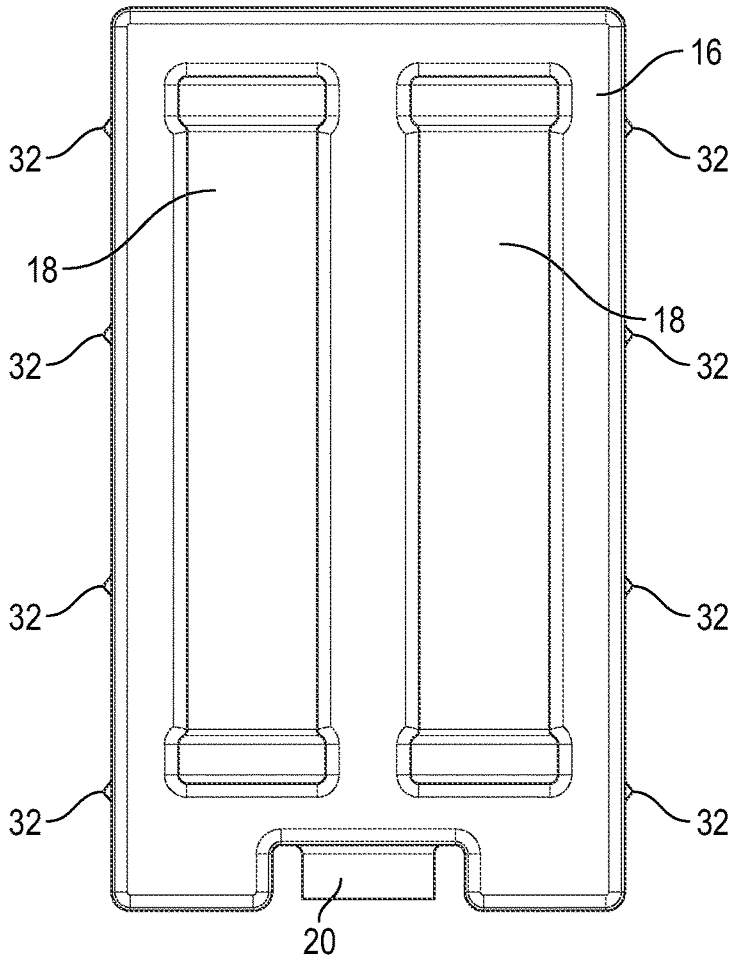
FIG. 7 is a top view thereof.
Figure 8:
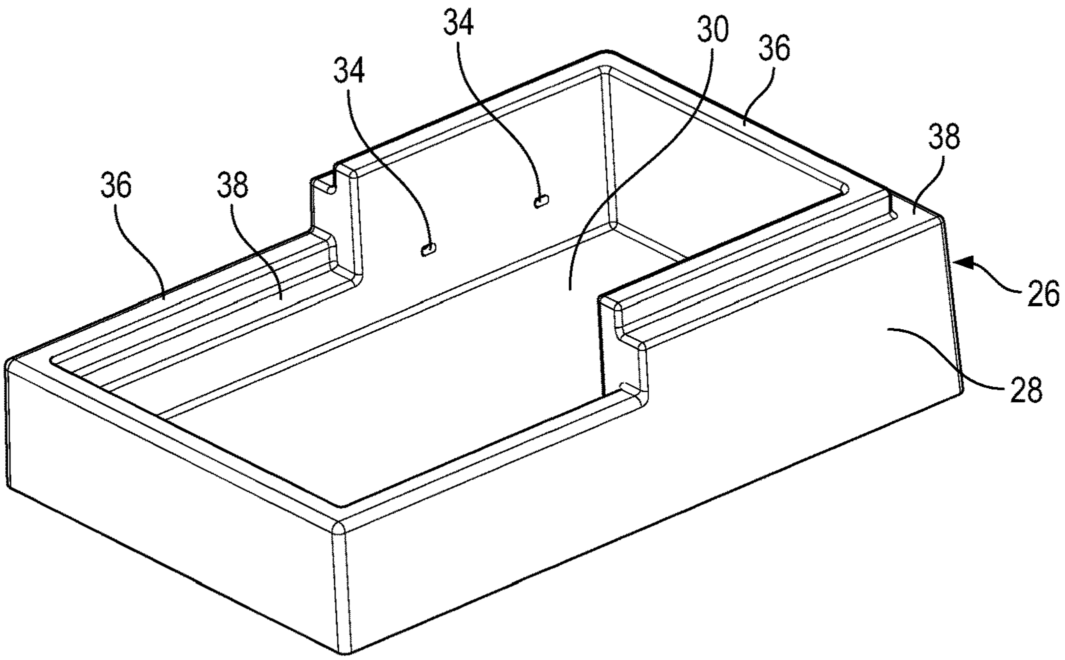
FIG. 8 is a perspective view of the insulated clamshell portion of the shipper.
Figure 9:
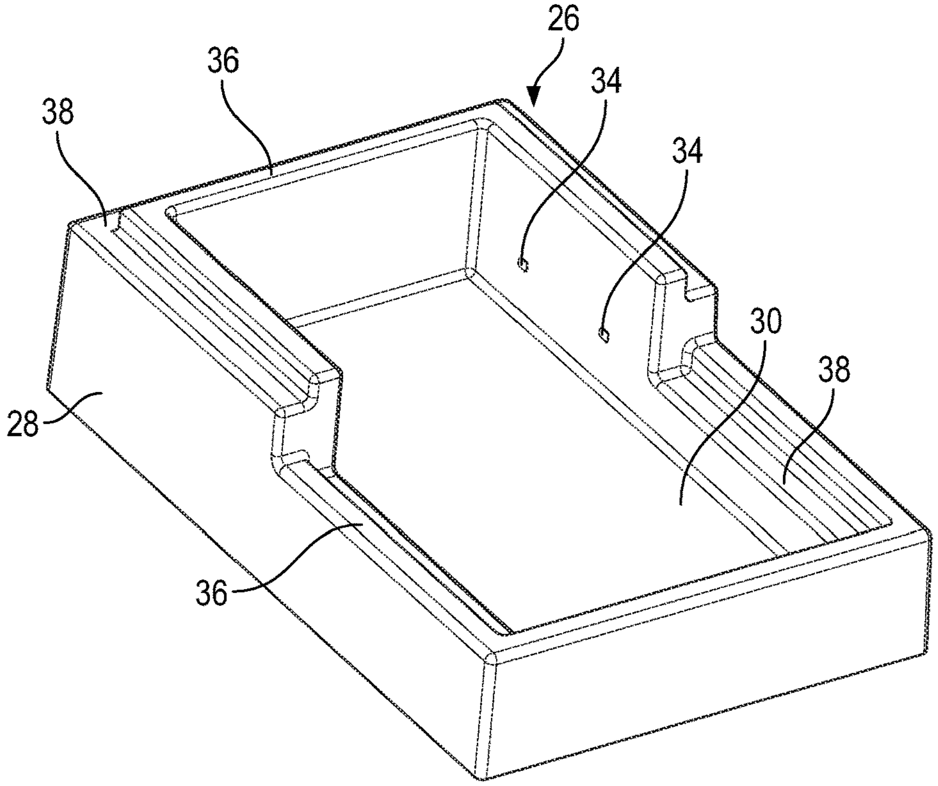
FIG. 9 is another perspective view thereof.

As best seen in FIGS. 1 and 5, each of the clamshell insulating portions 26 comprises a main body portion 28 having an interior surface contoured and shaped with a rectangular cavity 30 to receive a corresponding PCM bottle 16. Each clamshell portion 26 receives the corresponding PCM bottle 16 in frictional engagement, and to this end, the outer peripheral sidewalls of the PCM bottles 16 include raised locking nubs 32 which are snap received into complementary detents 34 in the inner sidewalls of the clamshell cavities 30. (See FIGS. 6-9 for the clear illustrations of the interfitting nubs and detents.)

In use, the PCM bottles 16 are snap received into a corresponding clamshell portion 26 and the blood sample vials 12 are simply placed into the bottle cavities 18.

To retain the two clamshell portions 26 together to define the insulating case 24, the outer peripheral edges of the clamshell portions 26 also include inter-fitting mating ridges 36 and shoulders 38 which are snap received together in a friction fit. Cross-sections of the entire shipper assembly 10 are illustrated in FIGS. 3 and 5.

Referring briefly back to FIG. 1, the rear surface cavity of the clamshell portions 26 are filled with an insulating foam material 40, or other suitable insulating material. A rear cover 42 is received over the rear cavity to retain the insulation 40 in place. The rear cover 42 may be edge sealed or may be snap received with the bottom of the clamshell main body with tab and slot structures (not shown) or otherwise connected as suitable.

The assembled clamshell portions (See FIGS. 2 and 4) are then received into a cardboard outer box 44 for shipping.

The exemplary clamshell portions 26 are noted herein to be identical which reduces molding costs and simplifies reuse and interchangeability, but different shapes may be used for the top and bottom portions as desired.

Further in accordance with the exemplary embodiments, a PCM material 22 comprising a novel dual PCM liquid suspension is utilized in the PCM bottles 16 and is preconditioned and stored at a single temperature. An exemplary dual phase change material mixture 22 comprises a first liquid phase change material having a first phase change temperature and a second microencapsulated phase change material having a second phase change temperature.

A thickening agent may be utilized in some embodiments to maintain the separate phase change materials in a homogenous liquid suspension. The first and second phase change materials are combined in a uniform homogenous suspended mixture and as noted above, pre-conditioned at a single temperature.

The dual-temperature PCM mixture may in some embodiments comprise 69% to 78% by weight of the first phase change material having a phase change temperature between 8° C. and 15° C. and 22% to 31% by weight of the second phase change material having a phase change temperature between 32° C. and 37° C.

In some embodiments, the PCM mixture is preconditioned at a temperature between 15° C. and 25° C.

In an exemplary embodiment, the first phase change material has a phase change temperature of about 9.5° C., and the second phase change material has a phase change temperature of about 37° C., and the PCM mixture is preconditioned at a temperature between 20° C. and 25° C.

It can therefore be seen that the present disclosure provides the following unique concepts: the provision of a unique PCM shipper including identical mating PCM containers which enclose and protect the diagnostic blood sample vials and which can be re-used; the provision of identical mating clamshell insulating containers which further enclose and protect the PCM containers and which can also be re-used; and a novel dual-temperature PCM mixture for use in the PCM containers which can be preconditioned and stored at a single temperature thus reducing energy consumption and storage requirements. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A temperature-controlled shipper comprising:

a product receptacle comprising first and second phase change material containers, each containing a dual phase change material liquid suspension comprising a first phase change material and a second phase change material combined in a homogenous suspension, said first and second phase change material containers being received in mated facing relation wherein facing surfaces thereof cooperate to define at least one product receiving cavity therebetween for receiving and enclosing a temperature sensitive product; and an insulating case comprising first and second insulated clamshell portions received in mated facing relation wherein facing surfaces thereof cooperate to define a cavity for receiving said product receptable, the first and second insulated clamshell portions each comprising a bi-level shape having a high level section and a low level section, the high level section of each insulated clamshell portion having a height greater than its low level section and the high level section of each insulated clamshell portion being configured to mate with the low level section of the other insulated clamshell portion, said first phase change container being frictionally received within said first insulated clamshell portion, said second phase change container being frictionally received within said second insulated clamshell portion, each of said first and second insulated clamshell portions comprising a ridge and a shoulder positioned along a perimeter of each of its high and low level sections, the ridges and shoulders of the first insulated clamshell portion being frictionally received in inter-fitting mated relation with the shoulders and ridges of the second insulated clamshell portion to retain said product receptacle and said insulating case in assembled relation.

2. The temperature-controlled shipper of claim 1 wherein said first and second phase change material containers each comprise molded bottles having a filling port and a cap for sealing the filling port.

3. The temperature-controlled shipper of claim 1 wherein said first and second phase change material containers are identical in shape.

4. The temperature-controlled shipper of claim 2 wherein said first and second phase change material containers are identical in shape.

5. The temperature-controlled shipper of claim 1 wherein said first and second insulated clamshell portions are identical in shape.

6. The temperature-controlled shipper of claim 2 wherein said first and second insulated clamshell portions are identical in shape.

7. The temperature-controlled shipper of claim 3 wherein said first and second insulated clamshell portions are identical in shape.

8. The temperature-controlled shipper of claim 1 wherein:

the first phase change material has a first phase change temperature; and the second phase change material has a second phase change temperature that differs from the first phase change temperature.

9. The temperature-controlled shipper of claim 8, wherein said first phase change material has a phase change temperature of about 9.5° C., wherein said second phase change material has a phase change temperature of about 37° C., and wherein said homogenous suspension is preconditioned at a temperature between 15° C. and 25° C.

10. The temperature-controlled shipper of claim 1 wherein said first phase change material is a liquid phase change material and said second phase change material is a microencapsulated phase change material.

11. The temperature-controlled shipper of claim 2 wherein said first phase change material is a liquid phase change material and said second phase change material is a microencapsulated phase change material.

12. The temperature-controlled shipper of claim 8 wherein said first phase change material is a liquid phase change material and said second phase change material is a microencapsulated phase change material.

13. The temperature-controlled shipper of claim 9 wherein said first phase change material is a liquid phase change material and said second phase change material is a microencapsulated phase change material.

14. The temperature-controlled shipper of claim 1, wherein the ridges and shoulders of each of the first and second insulated clamshell portions are arranged in an L-shape along the perimeter of each of the high and low level sections.

15. The temperature-controlled shipper of claim 1, wherein the ridges run along an inner perimeter of the high level sections of the first and second insulated clamshell portions and the shoulders run along an outer perimeter of the high level sections of the first and second insulated clamshell portions.

16. The temperature-controlled shipper of claim 1, wherein the ridges run along an outer perimeter of the low level sections of the first and second insulated clamshell portions and the shoulders run along an inner perimeter of the low level sections of the first and second insulated clamshell portions.

17. The temperature-controlled shipper of claim 1, wherein the high level sections of the first and second insulated clamshell portions each comprise at least one detent configured to receive at least one locking nub positioned on the product receptacle.

* * * * *